United States Patent [19]

Trahan

[11] Patent Number: 5,231,905

[45] Date of Patent: Aug. 3, 1993

[54] TABLE SAW ACCESSORY

[76] Inventor: Curtis P. Trahan, Rt-1 Box 1194N, Sulphur, La. 70663

[21] Appl. No.: 936,286

[22] Filed: Aug. 28, 1992

[51] Int. Cl.$^5$ .............................. B26D 7/01; B27B 5/00
[52] U.S. Cl. ...................................... 83/439; 83/410.9; 83/733; 269/57
[58] Field of Search ................... 83/410.9, 410.8, 412, 83/413, 733, 439, 802

[56]  References Cited

U.S. PATENT DOCUMENTS

| 149,654 | 4/1874 | Hanna et al. | 83/410.9 |
| 207,455 | 8/1878 | Stout | 83/410.9 |
| 403,618 | 5/1889 | Springstead | 83/410.9 |
| 1,944,524 | 11/1932 | Parrish | 83/410.8 |
| 2,696,230 | 12/1954 | Libby | 83/439 |
| 2,720,897 | 10/1955 | Kairath | 83/439 |
| 2,766,784 | 10/1956 | Antczak | 83/439 X |
| 3,995,521 | 12/1976 | Raphael | 83/410.9 |
| 4,027,566 | 6/1977 | Harrill | 83/410.9 |
| 4,398,440 | 8/1983 | Epstein | 83/439 |
| 4,986,152 | 1/1991 | Sammons | 83/410.9 X |

Primary Examiner—Douglas D. Watts
Assistant Examiner—Rinaldi Rada
Attorney, Agent, or Firm—Richard C. Litman

[57] ABSTRACT

An easily attachable and detachable accessory to a bandsaw or jigsaw table. The device allows for the cutting of circles or partial arcs. The frame of the device has a protruding member that slides into the existing groove in the saw table and a travel stop that allows the frame to be held firmly in place. An adjustable arm slides perpendicular to the cutting plane of the saw. This arm carries a pivot pin that extends through a slot that extends the length of the frame. A workpiece is drilled to fit on the pivot pin, or a template with an upper surface having a high friction coefficient is used.

9 Claims, 2 Drawing Sheets

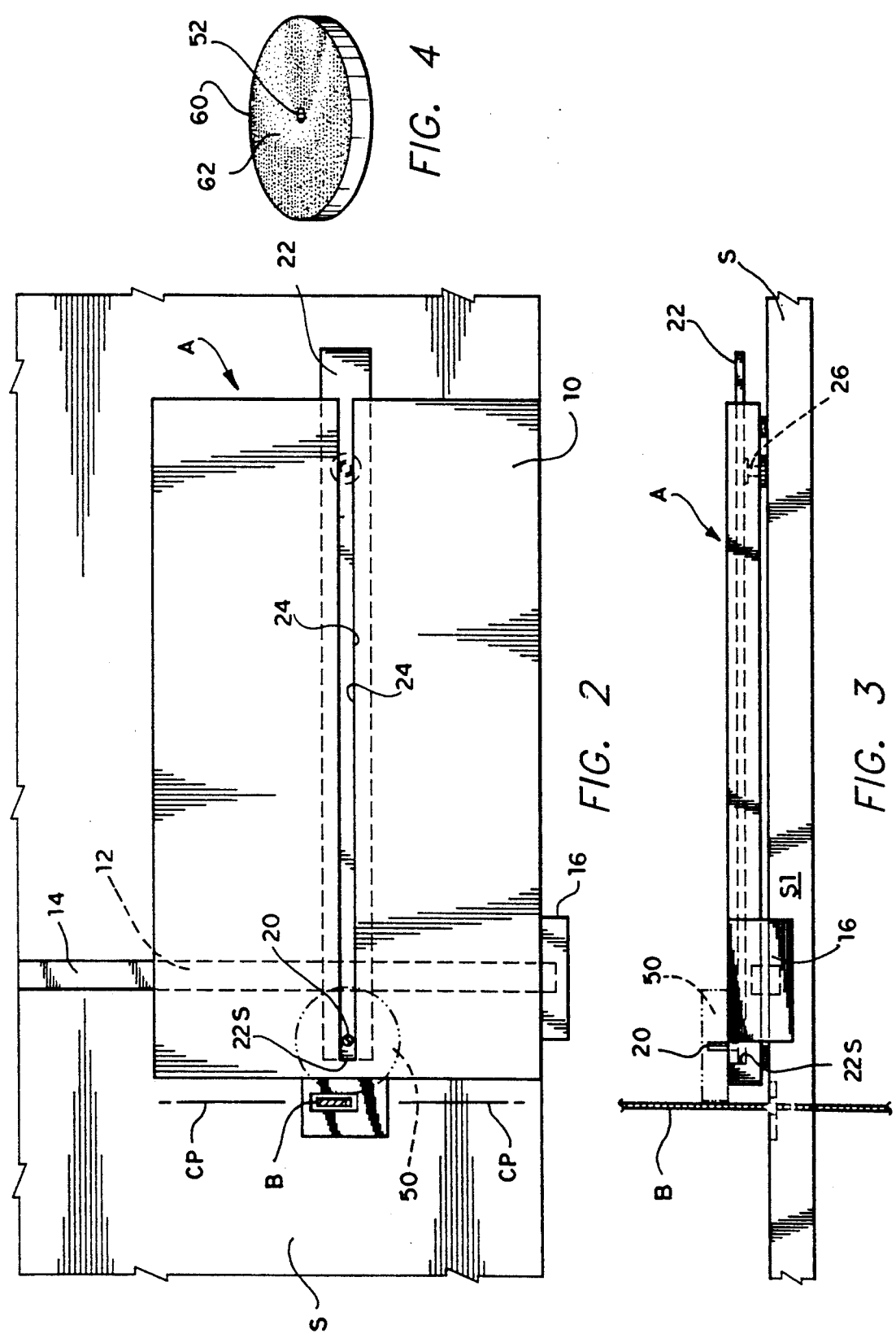

TABLE SAW ACCESSORY

BACKGROUND OF THE INVENTION

1. Field of the Invention

The present invention relates to a bandsaw or jigsaw accessory. More specifically, it relates to a device attachable to the worktable of the saw where a slidable pivot pin that engages either the workpiece itself or a frictionally padded template allows for the cutting of a circle or a partial arcuate edge by allowing the user to select a radius and then rotate the workpiece or template on the pivot pin relative to the cutting plane of the saw.

2. Description of the Prior Art

When working with wood, especially with a band or jigsaw, one of the more difficult tasks is to cut smooth arcs or circles in the workpiece. In many cases, often the woodworker will simply trace out the circle or arc with a protractor or similar geometric instrument and then cut the desired shape by carefully manipulating the piece so that the blade follows the trace, thus producing the shape intended. This is made difficult by the moving blade itself exerting force against the workpiece making the process slow and potentially dangerous. In other cases, human error can ruin the piece, thus wasting the raw materials and adding time to the project. There have been a number of proposed solutions to this problem but as will be seen, they are complicated and require cumbersome or permanent attachments to the saw table, thus forcing the user to assemble and disassemble the device every time one needs to use it.

U.S. Pat. No. 149,654 issued on Apr. 17, 1874 to Edward H. Hanna et al. discloses an improvement for saw tables wherein a pitch board has two screws that attach it to the bed plate of the saw table. The angle of the pitch board relative to the horizontal bed plate is fixed by two adjusting bars that are attached to the pitch board and the bed, and that engage one another. There is a graduated radius plate attached to the pitch board and to a pivot bolt. The workpiece is clamped to the pitch board and the graduated radius plate is adjusted to the desired mark. The entire assembly can then be rotated about the pivot bolt thus cutting the desired arc.

U.S. Pat. No. 207,455 issued on Aug. 27, 1878 to Charles Stout discloses a barrel head machine wherein a pin is mounted on the saw table. This mounting can be adjustable with a screw running perpendicular to the cutting plane of the saw. Mounted on the pin is a table. On the table are a number of peg holes and another screw which acts as a sliding nut carrying a fence. Both the fence and the pegs serve to hold the workpiece stationary while the table is rotated on the pin to cut an arc about the desired radius.

U.S. Pat. No. 403,618 issued on May 21, 1889 to Abram B. Springstead discloses a work feeder for band saws wherein a segmental frame pivots freely in the horizontal frame about an eye lug set in an adjustable bar. In FIG. 6 a device is shown for rounding the edges of boards where a center bar has a base clamp and a pivoted center. There are spurs that press into the workpiece, holding it in place while a board carrying frame is rotated.

U.S. Pat. No. 1,944,524 issued on Jan. 23, 1934 to George L. Parrish discloses a guiding attachment for band saws where a bar is held in a horizontal position by a telescopic extension placed on the ground. There are two sliding gauge supports movable on the bar and two work engaging members having downwardly extending spurs. There are pivot sockets and clamping devices in each of the gauge members that allow the work engaging members to be clamped in the proper relationship and then rotated to cut a circle or an arc related to a predetermined radius.

None of the above inventions and patents, taken either singly or in combination, is seen to describe the instant invention as claimed.

SUMMARY OF THE INVENTION

The invention is an easily attachable and detachable accessory to a bandsaw or jigsaw table. The device allows for the cutting of circles or partial arcs. The frame of the device slides into the existing groove in the saw table and a travel stop allows it to be held firmly in place. An adjustable arm slides perpendicular to the cutting plane of the saw. This arm carries a pivot pin that protrudes through a slot that extends the length of the frame.

Accordingly, it is a principal object of the invention to provide an accessory for cutting circles or partial arcs on a table saw.

It is another object of the invention to provide an accessory that is easily attached and detached from the table saw.

It is a further object of the invention to provide an accessory for cutting circles or arcs on a table saw where the radius of the circle (or of a 360 degree extension of the partial arc) is adjustable.

Still another object of the invention is to provide an accessory for cutting circles or partial arcs on a table saw where an adjustable arm carries a pivot pin for mounting the piece to be cut at a fixed distance from the blade of the saw.

It is still yet a further object of the invention to provide an accessory for cutting circles or partial arcs on a table saw where the adjustable arm carrying the pivot pin can be fixed in place by a clamp or set screw to prevent the arm from shifting during the cutting process.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2 is a top plan view.

FIG. 3 is a side elevational view.

FIG. 4 is a perspective view of a circular template used if the article to be cut with the accessory cannot be drilled, or a large number of identical articles are desired.

Similar reference characters denote corresponding features consistently throughout the attached drawings.

DETAILED DESCRIPTION OF THE PREFERRED EMBODIMENT

Figure 1:
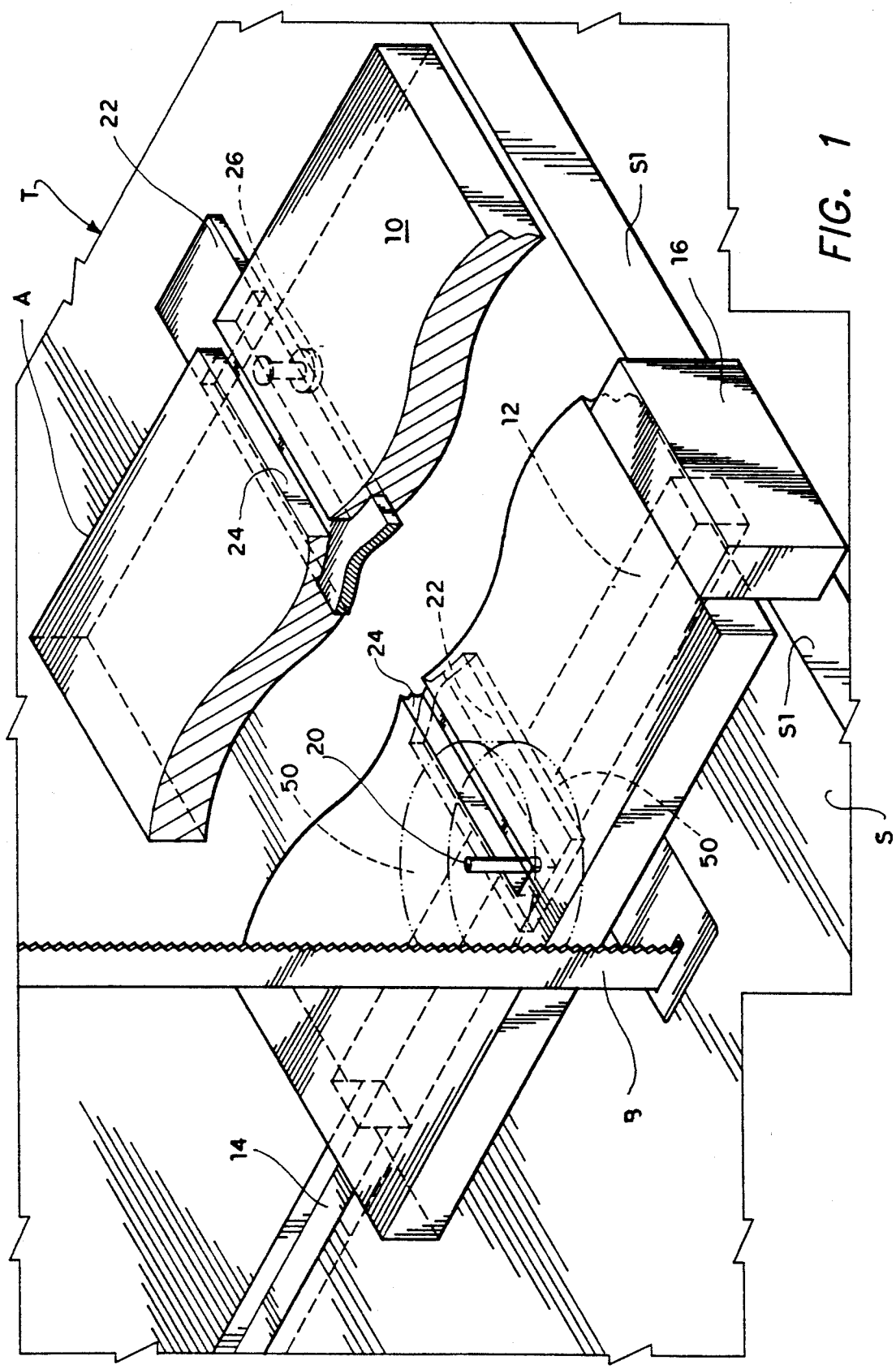
FIG. 1 is an environmental perspective view of the table saw accessory with the workpiece shown in broken lines proximate to the blade of the saw.

Referring to FIGS. 1 to 3, the table saw accessory A is shown placed overlying the table saw surface S. The generally planar frame 10 of the accessory A engages the saw table T by means of a protruding member 12 (shown in broken lines) on the bottom of the accessory A that fits into the slot 14 on the table surface S. A travel stop 16, which is attached to one end of protruding member 12, limits the movement of accessory A and allows it to be held in a fixed relationship with the table surface S. Projecting upward and through the planar frame 10 is a pivot pin 20 that is attached to an adjustable arm 22. The arm 22 travels interiorly of the planar frame 10 carrying the pivot pin 20 therewith, thus enabling its placement at varying distances from the cutting plane CP of the blade B, cutting plane CP being shown in FIG. 2. There is a safety stop 22s to prevent the adjustable arm 22 from being accidentally extended into the cutting plane CP of the blade B, and there is a longitudinal opening 24 that allows the pin 20 to extend therethrough and travel freely above the frame 10. The longitudinal opening 24 is of sufficient width for the passing therethrough of the pin 20. The adjustable arm 22 could be marked or graduated to allow easy positioning of the pin 20 at a set distance from the cutting plane CP of the saw blade B. A set screw 26 is tightened down to fix the adjustable arm 22 and the pin 20 connected to it at the distance desired from the cutting plane CP of saw blade B. It should be noted that the set screw 26 could be a clamp engaging the arm 22 and the planar frame 10, or the set screw 26 could be configured perpendicularly to the position in which it is shown, extending transversely through a part of the planar frame 10 to engage the arm 22 on its side instead of the its bottom.

The accessory A is used by first placing it in engagement with the table surface S by sliding the protruding member 12 in the slot 14 until the travel stop 16 butts against the edge S1 of the table surface S of the table surface S. Other methods of securing the accessory A would be obvious, such as a number of screw clamps on the periphery of the planar frame 10 that would engage the table surface S. These clamps could be integral with the planar frame 10 or be detachable. A number of over-center locking type of clamps could also be used in the same manner. The arm 22 is moved until the pivot pin 20 is at the desired distance from the saw blade B. Marked gradations on the adjustable arm 22 would allow the distance to be fixed easily. The distance would be the radius of the circle to be cut or, if a partial arc is desired, the radius of the circle that an extension of the arc through 360 degrees would define. The workpiece 50 (shown in broken lines) is placed on the pin 20 by a hole 52 drilled in workpiece 50 or template 60. This hole 52 is shown clearly in template 60 in FIG. 4. Use of the template 60 would be indicated if a large number of pieces with identical radii were desired, or if the workpiece 50 could not be drilled. The template 60 has, on its upper surface 62, a layer of material with a high friction coefficient, such as a tacky rubber or the like. The template 60 is of sufficient height to completely enclose the pin 20, preventing it from extending past the upper surface 62 of the template 60 and interfering with the placement of the piece to be cut (not shown). After the workpiece 50 or the template 60 is in place, and in the latter case, the article to be cut (not shown) is positioned on the upper surface 62 of the template 60, the workpiece 50 or assembly of the template 60 and its accompanying article (not shown) is rotated on the pin 20 through the cutting plane of the blade B, resulting in a circle, if the rotation is carried out through an entire 360 degrees, or a partial arc, if the rotation is less than 360 degrees. A number of varying shapes can be produced by both changing the distance of the pin 20 from the blade B and manipulating the workpiece 50 or the article (not shown) placed on template 60 to change the direction of the cut.

It is to be understood that the present invention is not limited to the sole embodiment described above, but encompasses any and all embodiments within the scope of the following claims.

I claim:

1. An accessory for a table saw comprising:
a planar frame having a longitudinal slot;
means to engage said planar frame with a saw table, said means to engage said planar frame including a protruding member that matingly engages a slot in the saw table;
a travel stop integrally attached to one end of said protruding member, said travel stop cooperating with a side of the saw table to hold said planar frame in a fixed relationship with the saw table;
an adjustable arm slidably connected with said planar frame; and
a pivot pin integrally connected to said adjustable arm and extending through said longitudinal slot; whereby
said adjustable arm is moved to a predetermined position, thus setting said integrally connected pin at a fixed distance from a saw blade having a cutting plane, and an article to be cut is placed on said pin and rotated through the cutting plane of the blade, resulting in an arc or circle, dependent on the number of degrees through which the article is rotated.

2. The accessory as claimed in claim 1 wherein said adjustable arm is positioned in a predetermined location interiorly of said planar frame.

3. The accessory as claimed in claim 1, wherein said planar frame includes a securement means removably engageable with said adjustable arm to temporarily hold said adjustable arm in a fixed relationship with said planar frame.

4. The accessory as claimed in claim 3 wherein said securement means includes a set screw.

5. An accessory for a table saw comprising:
a planar frame having a longitudinal slot;
means to engage said planar frame with a saw table, said means to engage said planar frame further including a protruding member that matingly engages a slot in the saw table;
a travel stop integrally attached at one end of said protruding member, said travel stop cooperating with a side of the saw table to hold said planar frame in a fixed relationship with the saw table;
an adjustable arm slidably connected with said planar frame;
a pivot pin integrally connected to said adjustable arm and extending through said longitudinal slot; and
a template removably engageable with said pivot pin; whereby
said adjustable arm is moved to a predetermined position, thus setting said integrally connected pin at a fixed distance from a saw blade having a cutting plane, said template is engaged with said pin, an article to be cut is placed on said template and the article and said template are rotated through the cutting plane of the blade, resulting in an arc or circle, dependent on the number of degrees through which the article or template are rotated.

6. The accessory as claimed in claim 5 wherein said adjustable arm is positioned in a predetermined location interiorly of said planar frame.

7. The accessory as claimed in claim 5, wherein said planar frame includes a securement means removably engageable with said adjustable arm to temporarily hold said adjustable arm in a fixed relationship with said planar frame.

8. The accessory as claimed in claim 7 wherein said securement means includes a set screw.

9. The accessory as claimed in claim 5 wherein said template further includes an upper surface, said upper surface further comprising a material having a high friction coefficient.

* * * * *